Patented Sept. 2, 1941

2,254,876

UNITED STATES PATENT OFFICE 2,254,876

SUBSTITUTED-1,3-DIOXANES

Murray Senkus, Terre Haute, Ind., assignor to Commercial Solvents Corporation, Terre Haute, Ind., a corporation of Maryland No Drawing. Application July 18, 1940,
Serial No. 346,146

8 Claims. (Cl. 260—338)

My invention relates to new and useful substituted-1,3-dioxanes. More particularly, it is concerned with 5-substituted-imino-1,3-dioxanes having the following general structural formula:

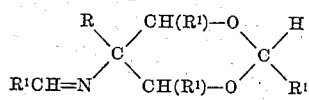

wherein R may represent hydrogen, alpha-hydroxyalkyl, or alkyl, and $R^1$ may be hydrogen, alkyl, furyl, or aryl. As examples of compounds which are included by the above generic formula, there may be mentioned the 5-benzylideneimino-1,3-dioxanes, the 5-(2-ethylhexylideneimino)-1,3-dioxanes, and the 5-methyleneimino-1,3-dioxanes, which may be represented respectively by the following structural formulas:

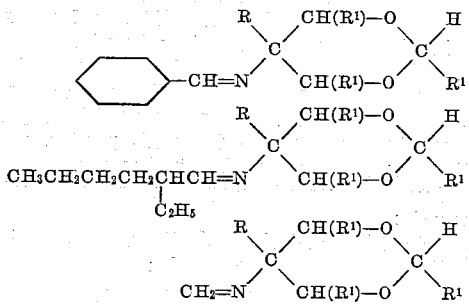

in which R may be either hydrogen, alpha-hydroxyalkyl, or alkyl, and $R^1$ is hydrogen, alkyl, furyl, or aryl.

Specific examples of the 5-substituted-imino-1,3-dioxanes are 2-phenyl-5-methyl-5-methyleneimino-1,3-dioxane, 2-furyl-5-methyl-5-furfurylideneimino-1,3-dioxane, 2-propyl-5-hydroxymethyl-5-butylideneimino-1,3-dioxane and 2-propyl-5-methyl-5-benzylideneimino-1,3-dioxane.

Compounds of the above type may be conveniently prepared by distilling a mixture of an aldehyde and the required 5-amino-1,3-dioxane. Although I generally prefer to employ equimolecular quantities of aldehyde and 5-amino-1,3-dioxane, I have also found it desirable, on certain occasions, to use a molecular excess of the aldehyde. During the reaction water is liberated as a result of the aldehyde-amine condensation, and may be conveniently distilled from the reaction mixture, as produced. If desired, said water may be satisfactorily distilled from the mixture by the addition of an organic liquid, such as benzene or toluene, whch is capable of forming a constant boiling mixture with said water.

The compounds produced in the manner outlined above include both liquid and solid products. The 5-substituted-imino-1,3-dioxanes which are liquids at ordinary temperatures, may be conveniently purified by drying the same over a solid dehydrating agent, such as calcium chloride or anhydrous calcium sulfate, after which the dried product is subjected to distillation under reduced pressure. Likewise, the liquid 5-substituted-imino-1,3-dioxanes may also be conveniently dehydrated by distilling the crude product with benzene, or similar liquid. The 5-substituted-imino-1,3-dioxanes which are solids at ordinary temperatures, may be readily separated from the crude reaction mixture by filtration, or any other satisfactory means. If it is desired to further purify these solid products, such purification may be effected by recrystallizing said products from a suitable organic solvent, such as methanol, ether benzene, and the like. Colored impurities which might be present in either the liquid or solid products, may be satisfactorily removed by means of heating said products in the presence of a small quantity of suitable decolorizing carbons, or similar materials.

The 5-amino-1,3-dioxanes, employed in the preparation of the 5-substituted-imino-1,3-dioxanes of my invention, may be prepared in accordance with any known procedure. I prefer, however, to prepare these compounds by first producing the corresponding nitro derivative in accordance with the procedure disclosed in my co-pending application, U. S. Ser. No. 331,769, filed April 26, 1940, and subsequently reducing the nitro derivative. The reduction may suitably be effected by subjecting the nitro derivative to liquid phase hydrogenation in the presence of a nickel catalyst, in accordance with the procedure described in my co-pending application, U. S. Ser. No. 331,770, filed April 26, 1940. According to the procedure of U. S. Ser. No. 331,769, referred to above, the nitro compound may be prepared by distilling a mixture consisting of a polyhydroxy nitro compound and the required aldehyde in the presence of a small amount of mineral acid catalyst. The 5-nitro-1,3-dioxanes thus produced may then be subjected to liquid phase hydrogenation, as described in U. S. Ser. No. 331,770, mentioned above. According to this process, the corresponding nitro compound is hydrogenated at normal or elevated pressures, in the presence of a nickel catalyst, in the liquid phase, with or without an auxiliary solvent, at a temperature below 125° C. After hydrogenation is complete, the catalyst is filtered off, and the solvent, if employed, is separated from the crude 5-amino-1,3-dioxane, by distillation. Further purification of the 5-amino-1,3-dioxanes, obtained in this manner, may be readily effected in accordance with standard procedures.

The 5-amino-1,3-dioxanes which may be employed in my invention comprise any of such compounds which are capable of forming the corresponding imino derivatives. Specifically, these compounds may be represented by the following general formula:

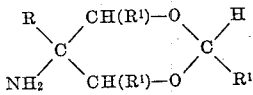

in which R may represent hydrogen, alpha-hydroxyalkyl, or alkyl, and $R^1$ may be alkyl, aryl, furyl, or hydrogen.

As examples of the numerous 5-amino-1,3-dioxanes, included by the above generic formula, there may be mentioned 2-propyl-5-hydroxymethyl-5-amino-1,3-dioxane, 2-phenyl-5-methyl-5-amino-1,3-dioxane, 2-(3-heptyl)-5-methyl-5-amino-1,3-dioxane, 2-propyl-5-methyl-5-amino-1,3-dioxane, 2-furyl-5-methyl-5-amino-1,3-dioxane, and the like.

The aldehydes utilized in the preparation of the 5-substituted-imino-1,3-dioxanes of my invention, constitute those aldehydes which are capable of reacting with the 5-amino-1,3-dioxanes of the type mentioned above, to form the corresponding 5-substituted-imino-1,3-dioxanes, and it is to be understood that the term "aldehyde," appearing in certain of the appended claims, is to be construed as such. Such aldehydes may be represented by the following general formula:

RCHO in which R may represent hydrogen, alkyl, furyl, aryl, or a similar organic residue. Aldehydes that are particularly applicable in the preparation of the 5-substituted-imino-1,3-dioxanes of my invention, and which are included by the above formula, are formaldehyde, acetaldehyde, butyraldehyde, heptaldehyde, 2-ethylhexanal, benzaldehyde, and furfuraldehyde. The use of other aldehydes will be readily suggested to those skilled in the art, and therefore the above-mentioned examples are to be considered as merely illustrative, rather than limitative.

The following examples describe certain of the new 5-substituted-imino-1,3-dioxanes, and methods for their preparation; however, they are not to be considered as limiting my invention, since I have found that the reaction between the aldehydes and 5-amino-1,3-dioxanes, of the types mentioned above, is general, and may be readily effected.

*Example I*

A mixture consisting of 75 parts of 5-ethyl-5-amino-1,3-dioxane and 44 parts of formaldehyde was distilled until approximately 110 parts of distillate were obtained. The residue which consisted principally of 5-ethyl-5-methyleneimino-1,3-dioxane was then distilled, and the fraction, boiling at 65–70° C. (3 mm.), was collected. The distillate thus obtained amounted to 94 parts, corresponding to a yield of 91%. On standing, the product solidified, and after one crystallization from ether, melted at 74° C. (uncorrected).

Analysis.—Calculated for $C_7H_{13}NO_2$: N, 9.79. Found: N, 9.75.

*Example II*

2-propyl-5-benzylideneimino-5-methyl-1,3-dioxane was prepared by distilling a mixture consisting of 16 parts of 2-propyl-5-methyl-5-amino-1,3-dioxane, 10.6 parts of benzaldehyde, and 45 parts of toluene. This mixture was distilled until 1.2 parts of water and 25 parts of toluene had been recovered, after which the remainder of the water formed during the reaction, and toluene, were distilled off under reduced pressure. The residue, consisting of 2-propyl-5-benzylideneimino-5-methyl-1,3-dioxane, which solidified on cooling, amounted to 24 parts, corresponding to a yield of 98%. After one recrystallization from petroleum ether, the product was obtained in the form of colorless crystals, melting at 33° C.

Analysis.—Calculated for $C_{15}H_2NO_2$: N, 5.63. Found: N, 5.63.

*Example III*

Twenty-two parts of 2-ethylhexanal was dissolved in 20.8 parts of 5-amino-5-ethyl-1,3-dioxane, and the resulting solution allowed to stand for approximately twelve hours during which time said solution separated into two layers, the upper layer consisting chiefly of crude 5-(2-ethylhexylideneimino)-5-ethyl-1,3-dioxane, while the lower layer consisted of water and dissolved impurities. Upon distillation of the non-aqueous layer, 28 parts of 5-(2-ethylhexylidene-imino)-5-ethyl-1,3-dioxane, boiling at 115–116° C. (3 mm.) was obtained, corresponding to a yield of 81%.

Analysis.—Calculated for $C_{14}H_{27}NO_2$: N, 5.80. Found: N, 5.85.

The 5-substituted-imino-1,3-dioxanes, prepared as outlined above, are either colorless liquids, or white crystalline solids, and are soluble in the common organic solvents, such as methanol, ether, benzene, and petroleum ether. These materials are useful as intermediates in the preparation of numerous valuable organic compounds. Other uses for such products will readily occur to those skilled in the art.

My invention now having been described, what I claim is:

1. 5-Substituted-imino-1,3-dioxanes having the following structural formula:

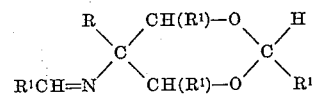

wherein R is a member of the group consisting of hydrogen, alkyl, and alpha-hydroxyalkyl and $R^1$ is a member of the group consisting of hydrogen, alkyl, aryl, and furyl.

2. 5-Substituted-imino-1,3-dioxanes having the following structural formula:

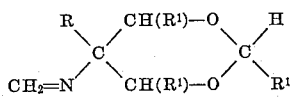

wherein R is a member of the group consisting of hydrogen, alkyl, and alpha-hydroxyalkyl and $R^1$ is a member of the group consisting of hydrogen, alkyl, aryl, and furyl.

3. 5-Substituted-imino-1,3-dioxanes having the following structural formula:

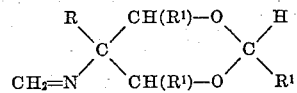

wherein R is a member of the group consisting of hydrogen, alkyl, and alpha-hydroxyalkyl and $R^1$ is a member of the group consisting of hydrogen, alkyl, aryl, and furyl.

4. 5-Substituted-imino-1,3-dioxanes having the following structural formula:

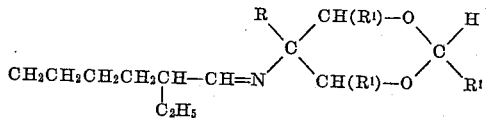

wherein R is a member of the group consisting of hydrogen, alkyl and alpha-hydroxyalkyl and $R^1$ is a member of the group consisting of hydrogen, alkyl, aryl, and furyl.

5. 5-Ethyl-5-methyleneimino-1,3-dioxane.

6. 2-Propyl-5-benzylideneimino-5-methyl-1,3-dioxane.

7. 5-(2-Ethylhexylideneimino)-5-ethyl-1,3-dioxane.

8. In a process for the production of 5-substituted-imino-1,3-dioxanes, the step which comprises reacting an aldehyde with a 5-amino-1,3-dioxane having the structural formula:

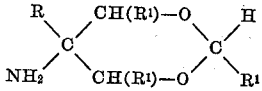

wherein R is a member of the group consisting of hydrogen, alkyl, and alpha-hydroxyalkyl and $R^1$ is a member of the group consisting of hydrogen, alkyl, aryl, and furyl.

MURRAY SENKUS.

Certificate of Correction

Patent No. 2,254,876. September 2, 1941.

MURRAY SENKUS

It is hereby certified that error appears in the printed specification of the above numbered patent requiring correction as follows: Page 2, second column, lines 70 to 74 inclusive, claim 3, strike out the formula and insert instead the following—

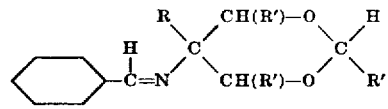

and that the said Letters Patent should be read with this correction therein that the same may conform to the record of the case in the Patent Office.

Signed and sealed this 28th day of July, A. D. 1942.

[SEAL]

HENRY VAN ARSDALE,
*Acting Commissioner of Patents.*